United States Patent
Shpilyuck et al.

(10) Patent No.: US 11,968,086 B1
(45) Date of Patent: Apr. 23, 2024

(54) ISOLATED ENVIRONMENT PROVISIONING IN SERVICE MESH-BASED MICROSERVICES SYSTEMS

(71) Applicant: Dell Products L.P., Round Rock, TX (US)

(72) Inventors: Boris Shpilyuck, Ashdod (IL); Nisan Haimov, Be'er-Sheva (IL); Igor Dubrovsky, Be'er-Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/156,183

(22) Filed: Jan. 18, 2023

(51) Int. Cl.
*H04L 47/24* (2022.01)
*G06F 8/65* (2018.01)
*H04L 41/082* (2022.01)
*H04L 67/63* (2022.01)

(52) U.S. Cl.
CPC .............. *H04L 41/082* (2013.01); *G06F 8/65* (2013.01); *H04L 67/63* (2022.05)

(58) Field of Classification Search
None
See application file for complete search history.

(56) References Cited

U.S. PATENT DOCUMENTS

| | | | | |
|---|---|---|---|---|
| 11,153,412 B1 * | 10/2021 | Varadan | ................. | H04L 67/133 |
| 11,457,080 B1 * | 9/2022 | Meduri | ................... | H04L 67/60 |
| 11,563,636 B1 * | 1/2023 | Kairali | ................... | H04L 67/562 |
| 11,570,271 B2 * | 1/2023 | Bahl | ....................... | G06N 20/00 |
| 11,570,279 B1 * | 1/2023 | Kairali | ................ | H04L 41/0886 |
| 2020/0120168 A1 * | 4/2020 | Nainar | ..................... | H04L 45/30 |
| 2020/0177549 A1 * | 6/2020 | Barton | .................... | H04L 41/40 |
| 2021/0174952 A1 * | 6/2021 | Leong | .................... | G16H 50/20 |
| 2022/0109741 A1 * | 4/2022 | Chen | ....................... | H04L 69/40 |

OTHER PUBLICATIONS

Shpilyuck, et al. "Isolated Environment Provisioning in Service Mesh-Based Microservices Systems" U.S. Appl. No. 18/151,903, filed Jan. 9, 2023, 57 pages.

Shpilyuck, et al. "Isolated Environment Provisioning in Service Mesh-Based Microservices Systems" U.S. Appl. No. 18/154,477, filed Jan. 13, 2023, 60 pages.

* cited by examiner

*Primary Examiner* — Christopher B Robinson

(74) *Attorney, Agent, or Firm* — Amin, Turocy & Watson, LLP

(57) ABSTRACT

A system can receive a changeset for an updated microservice and an identifier of a user account, wherein the updated microservice is relative to a current version of a microservice. The system can instantiate the updated microservice. The system can, in response to determining that a first instance of a dependent microservice depends on the current version of the microservice, instantiate a second instance of the dependent microservice. The system can update routing rules for the service mesh to indicate that any traffic that is associated with the user account and that is directed to the current version of the microservice is to be routed to the updated microservice, and any traffic directed from the updated microservice to the first instance of the dependent microservice is to be routed to the second instance of the dependent microservice.

20 Claims, 13 Drawing Sheets

500

600

(602)

↓

RECEIVING A CHANGESET FOR AN UPDATED MICROSERVICE AND AN IDENTIFIER OF A USER ACCOUNT THAT IS CONFIGURED TO ACCESS THE UPDATED MICROSERVICE, WHEREIN THE UPDATED MICROSERVICE REPRESENTS AN UPDATED VERSION RELATIVE TO A CURRENT VERSION OF A MICROSERVICE, AND WHEREIN THE CURRENT VERSION OF THE MICROSERVICE IS DEPLOYED TO A SERVICE MESH THAT COMPRISES A GROUP OF MICROSERVICES 604

↓

INSTANTIATING THE UPDATED MICROSERVICE TO THE SERVICE MESH BASED ON THE CHANGESET 606

↓

IN RESPONSE TO DETERMINING THAT A FIRST INSTANCE OF A DEPENDENT MICROSERVICE DEPENDS ON THE CURRENT VERSION OF THE MICROSERVICE, INSTANTIATING A SECOND INSTANCE OF THE DEPENDENT MICROSERVICE 608

↓

UPDATING ROUTING RULES FOR THE SERVICE MESH TO INDICATE THAT ANY TRAFFIC IN THE SERVICE MESH THAT IS ASSOCIATED WITH THE USER ACCOUNT AND THAT IS DIRECTED TO THE CURRENT VERSION OF THE MICROSERVICE IS TO BE ROUTED TO THE UPDATED MICROSERVICE, AND ANY TRAFFIC DIRECTED FROM THE UPDATED MICROSERVICE TO THE FIRST INSTANCE OF THE DEPENDENT MICROSERVICE IS TO BE ROUTED TO THE SECOND INSTANCE OF THE DEPENDENT MICROSERVICE 610

↓

IN RESPONSE TO RECEIVING TRAFFIC DETERMINED TO BE ASSOCIATED WITH THE USER ACCOUNT AND DIRECTED TO THE CURRENT VERSION OF THE MICROSERVICE, ROUTING THE TRAFFIC TO THE UPDATED MICROSERVICE INSTEAD OF ROUTING THE TRAFFIC TO THE CURRENT VERSION OF THE MICROSERVICE 612

IN RESPONSE TO DETERMINING THAT THE FIRST INSTANCE OF THE DEPENDENT MICROSERVICE ACCESSES A FIRST INSTANCE OF A DATA STORE, PROVISIONING A SECOND INSTANCE OF THE DATA STORE 704

CONFIGURING THE SECOND INSTANCE OF THE DEPENDENT MICROSERVICE TO ACCESS THE SECOND INSTANCE OF THE DATA STORE 706

RECEIVING A CHANGESET FOR AN UPDATED MICROSERVICE AND AN IDENTIFIER OF A USER ACCOUNT, WHEREIN THE UPDATED MICROSERVICE IS REPRESENTATIVE OF AN UPDATE TO A CURRENT VERSION OF A MICROSERVICE THAT IS DEPLOYED TO A SERVICE MESH 804

↓

DEPLOYING THE UPDATED MICROSERVICE TO THE SERVICE MESH BASED ON THE CHANGESET 806

↓

IN RESPONSE TO DETERMINING THAT A FIRST INSTANCE OF A DEPENDENT MICROSERVICE DEPENDS ON THE CURRENT VERSION OF THE MICROSERVICE, DEPLOYING A SECOND INSTANCE OF THE DEPENDENT MICROSERVICE TO THE SERVICE MESH 808

↓

UPDATING ROUTING RULES FOR THE SERVICE MESH TO INDICATE THAT FIRST TRAFFIC IN THE SERVICE MESH THAT IS ASSOCIATED WITH THE USER ACCOUNT AND THAT IS DIRECTED TO THE CURRENT VERSION OF THE MICROSERVICE IS TO BE ROUTED TO THE UPDATED MICROSERVICE, AND SECOND TRAFFIC DIRECTED FROM THE UPDATED MICROSERVICE TO THE FIRST INSTANCE OF THE DEPENDENT MICROSERVICE IS TO BE ROUTED TO THE SECOND INSTANCE OF THE DEPENDENT MICROSERVICE 810

DETERMINING THAT A SECOND DEPENDENT MICROSERVICE DEPENDS ON THE UPDATED MICROSERVICE BASED ON PERFORMING A STATIC ANALYSIS OF THE CHANGESET 904

DEPLOYING AN INSTANCE OF THE SECOND DEPENDENT MICROSERVICE TO THE SERVICE MESH 906

BASED ON RECEIVING AN IDENTIFIER OF A USER ACCOUNT AND A CHANGESET APPLICABLE TO GENERATE AN UPDATED MICROSERVICE RELATIVE TO A CURRENT VERSION OF A MICROSERVICE THAT IS DEPLOYED TO A SERVICE MESH, DEPLOYING THE UPDATED MICROSERVICE TO THE SERVICE MESH 1104

↓

IN RESPONSE TO DETERMINING THAT A FIRST INSTANCE OF A DEPENDENT MICROSERVICE DEPENDS ON THE CURRENT VERSION OF THE MICROSERVICE, DEPLOYING A SECOND INSTANCE OF THE DEPENDENT MICROSERVICE TO THE SERVICE MESH 1106

↓

UPDATING ROUTING RULES FOR THE SERVICE MESH TO INDICATE THAT ANY FIRST PORTIONS OF TRAFFIC IN THE SERVICE MESH THAT ARE ASSOCIATED WITH THE USER ACCOUNT AND THAT ARE DIRECTED TO THE CURRENT VERSION OF THE MICROSERVICE ARE TO BE ROUTED TO THE UPDATED MICROSERVICE, AND ANY SECOND PORTIONS OF TRAFFIC IN THE SERVICE MESH THAT ARE DIRECTED FROM THE UPDATED MICROSERVICE TO THE FIRST INSTANCE OF THE DEPENDENT MICROSERVICE ARE TO BE ROUTED TO THE SECOND INSTANCE OF THE DEPENDENT MICROSERVICE 1108

↓

IN RESPONSE TO RECEIVING FIRST TRAFFIC OF THE TRAFFIC, WHEREIN THE FIRST TRAFFIC IS DETERMINED TO BE ASSOCIATED WITH THE USER ACCOUNT AND DETERMINED TO BE DIRECTED TO THE CURRENT VERSION OF THE MICROSERVICE, ROUTING THE FIRST TRAFFIC TO THE UPDATED MICROSERVICE INSTEAD OF ROUTING THE FIRST TRAFFIC TO THE CURRENT VERSION OF THE MICROSERVICE 1110

ISOLATED ENVIRONMENT PROVISIONING IN SERVICE MESH-BASED MICROSERVICES SYSTEMS

BACKGROUND

Microservices can generally be a variant of a service-oriented architecture (SOA) computer architectural style that structures an application as a collection of loosely coupled services. Microservices can be deployed as part of a software as a service (SaaS) model, where a system of microservices is centrally hosted, and is accessed by a thin client (e.g., a web browser).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a changeset for an updated microservice and an identifier of a user account that is configured to access the updated microservice, wherein the updated microservice represents an updated version relative to a current version of a microservice, and wherein the current version of the microservice is deployed to a service mesh that comprises a group of microservices. The system can instantiate the updated microservice to the service mesh based on the changeset. The system can, in response to determining that a first instance of a dependent microservice depends on the current version of the microservice, instantiate a second instance of the dependent microservice. The system can update routing rules for the service mesh to indicate that any traffic in the service mesh that is associated with the user account and that is directed to the current version of the microservice is to be routed to the updated microservice, and any traffic directed from the updated microservice to the first instance of the dependent microservice is to be routed to the second instance of the dependent microservice. The system can, in response to receiving traffic determined to be associated with the user account and directed to the current version of the microservice, route the traffic to the updated microservice instead of routing the traffic to the current version of the microservice.

An example method can comprise receiving, by a system comprising a processor, a changeset for an updated microservice and an identifier of a user account, wherein the updated microservice is representative of an update to a current version of a microservice that is deployed to a service mesh. The method can further comprise deploying, by the system, the updated microservice to the service mesh based on the changeset. The method can further comprise, in response to determining that a first instance of a dependent microservice depends on the current version of the microservice, deploying, by the system, a second instance of the dependent microservice to the service mesh. The method can further comprise updating, by the system, routing rules for the service mesh to indicate that first traffic in the service mesh that is associated with the user account and that is directed to the current version of the microservice is to be routed to the updated microservice, and second traffic directed from the updated microservice to the first instance of the dependent microservice is to be routed to the second instance of the dependent microservice. The method can further comprise, in response to receiving traffic that is associated with the user account and that is directed to the current version of the microservice, routing, by the system, the traffic to the updated microservice while foregoing routing the traffic to the current version of the microservice.

An example non-transitory computer-readable medium can comprise instructions that, in response to execution, cause a system comprising a processor to perform operations. These operations can comprise, based on receiving an identifier of a user account and a changeset applicable to generate an updated microservice relative to a current version of a microservice that is deployed to a service mesh, deploying the updated microservice to the service mesh. These operations can further comprise, in response to determining that a first instance of a dependent microservice depends on the current version of the microservice, deploying a second instance of the dependent microservice to the service mesh. These operations can further comprise updating routing rules for the service mesh to indicate that any first portions of traffic in the service mesh that are associated with the user account and that are directed to the current version of the microservice are to be routed to the updated microservice, and any second portions of traffic in the service mesh that are directed from the updated microservice to the first instance of the dependent microservice are to be routed to the second instance of the dependent microservice. These operations can further comprise, in response to receiving first traffic of the traffic, wherein the first traffic is determined to be associated with the user account and determined to be directed to the current version of the microservice, routing the first traffic to the updated microservice instead of routing the first traffic to the current version of the microservice.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate isolated environment provisioning in service mesh-based microservices systems, in accordance with an embodiment of this disclosure;

FIG. 7 illustrates another example process flow that can facilitate isolated environment provisioning in service mesh-based microservices systems, in accordance with an embodiment of this disclosure;

FIG. 8 illustrates another example process flow that can facilitate isolated environment provisioning in service mesh-based microservices systems, in accordance with an embodiment of this disclosure;

FIG. 9 illustrates another example process flow that can facilitate isolated environment provisioning in service mesh-based microservices systems, in accordance with an embodiment of this disclosure;

FIG. 11 illustrates another example process flow that can facilitate isolated environment provisioning in service mesh-based microservices systems, in accordance with an embodiment of this disclosure;

DETAILED DESCRIPTION

Overview

Figure 1:
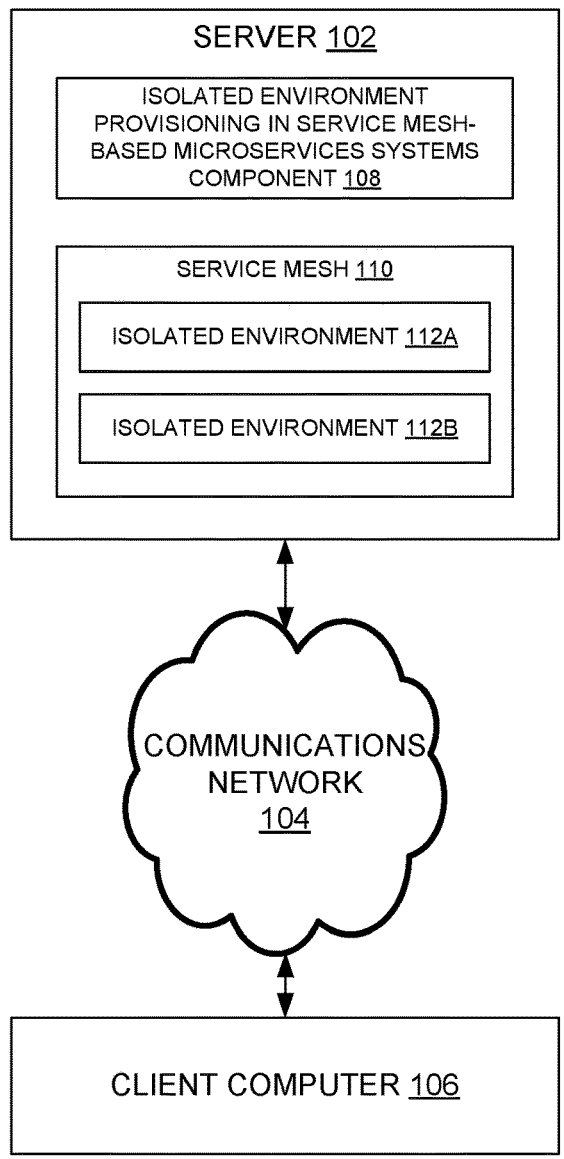
FIG. 1 illustrates an example system architecture that can facilitate isolated environment provisioning in service mesh-based microservices systems, in accordance with an embodiment of this disclosure.

The present techniques generally relate to efficiently creating an isolated environment for the user within existing service mesh. In some examples, a microservice instance that is created in an isolated environment can have dependent upon it another microservice. In such examples, it can be that another instance of the dependent microservice can be created in the isolated environment, along with the microservice instance.

It can be that typical microservices environments consist of hundreds or even thousands of the microservices that form a complex graph of dependencies between them. A service mesh can be used in such systems to ease the task of traffic routing, upgrades, access control, etc.

When a new feature or fix is developed, it can be desired to validate this feature or fix as a part of the whole service mesh. For example, if the feature introduces changes even to a single microservice, it can be desired that this microservice is tested as a part of the whole system to make sure that the system behavior is correct and new problems have not been introduced. This can also be relevant to critical production issues that cannot be easily reproduced in a staging environment due to specific production data—it can be desired that such fixes are thoroughly verified in production as a part of the whole service mesh, and without a risk of breaking the whole system.

Prior approaches in this area can generally be as follows. A prior approach can be to perform a simple validation of the microservice locally on a developer's computer, and then to submit the change to a staging environment where the change can be validated manually, and through automated tests.

But in case that the new change introduces a problem, another flow that depends on the changed microservice could become broken until the problem is discovered and resolved. Such an outcome can make the whole environment unusable, especially considering examples where multiple developers work on different microservices, and each one of them might introduce a problem.

Another prior approach can be to create a full copy of the current staging environment, just with the changed microservices instead of the original ones (such as in a separate namespace). Then testing can be performed in this environment, without introducing the problems to the main staging environment. In some examples, the changes will be deployed to the main staging environment only where the tests are successful. This approach can guarantee extra stability for the main staging branch, but can be very expensive—every introduced change can require a full copy of the original environment, which might consist of hundreds of the microservices.

Another prior approach can be to use feature flags to isolate the code changes, so only specific users that were defined per feature flag can reach the changes. It can be that this approach does not provide a complete solution because some changes are too wide and cannot be isolated (e.g., changing significant libraries, database drivers, etc.).

A problem addressed by the present techniques can be how to provision an isolated environment for new changes in such a way that it does not require a full copy of the original environment, and also does not introduce fragility due to multiple broken flows in the same shared environment.

A solution to this problem, according to the present techniques, can be to deploy changed microservices to a shared environment, where their instances can coexist alongside the original unchanged instances. Using a service mesh's capabilities and "deployment validator" information received from a continuous integration/continuous deployment (CI/CD) process, smart routing can be performed: a flow originated by the deployment validator can pass through the changed microservices instances, while a flow originated by other users can pass through the original microservices instances, which are not related to the changes. Microservices that are not related to the changes can be shared by both the deployment validator and other users.

Provisioning of an isolated environment within service mesh based microservice systems can allow deploying and verifying critical patches to an isolated environment directly within production, without effecting real production traffic. This ability can be critical where the problem can be tested/reproduced only in production due to a very specific circumstances/data. Provisioning of an isolated environment can also facilitate increasing development velocity by allowing much faster validation of features/fixes. The isolated environment can be created automatically, and can allow validating features without affecting other people who work in the environment, or, vice versa, being affected by their work in case of any problems in the introduced changes. The isolated environment can facilitate reducing costs associated with provisioning of a full copy of the environment for every change. Producing a full copy for every change can require lots of resources that are not always available in on-premise environments, or cost a lot of money in cloud environments.

In some examples, provisioning of an isolated environment can be a complex task due to the following reasons. There can be hundreds or thousands of microservices that have complex dependencies one on another. There can be multiple users that introduce changes within the same environment to multiple microservices. It can be infeasible to create a full copy of an original environment for every change. Taking these constraints into consideration, there can be a desire for a system that allows each user to have an "illusion" of having its own dedicated environment, even though in reality the environment is shared among dozens or hundreds of users.

In some examples, the present techniques can generally be divided into two parts: deploy time and runtime. In deploy time, there can be isolated environment provisioning, which can allow only a deployment validator's application programming interface (API) calls to pass through changed microservices, while other users' API calls pass through the original versions of the microservices. In runtime, end user information can be propagated through call chains to be able to achieve user-based routing described with respect to deploy time.

Handling dependent services can be implemented as follows. Each changed microservice that is deployed as part of provisioning an isolated environment can interact with other services. Therefore, it can be that these changed microservices could introduce problems to additional services that are shared among isolated and regular environments.

This can be an advanced problem due to input validation that can be expected to be applied at each microservice's API, where it can be that the problem is not encountered very often. In some examples, handling dependent services can be an optional decision for a user that deploys the changes.

From a current service mesh, a whole graph of dependencies of the current microservice of group of microservices can be known (this can be a subgraph of all the microservices in the service mesh graph).

From each microservice in this subgraph, a new microservice instance can be provisioned, and traffic can be rerouted to it for a given user.

Where the microservice is connected to a persistent store, persistence handling can be added.

Eventually, an isolated environment can comprise the new microservice instances per changed and dependent microservices.

In some examples, another use case can be handled—if, as a part of the current code change, an interaction with an additional microservice is added, it can be that the additional microservice is not discoverable from the current service mesh. In this case, the new dependency can be discovered based on static code analysis. In other example, a user can be required to provide input that identifies all dependencies that are added as part of this changeset.

The present techniques can be implemented to achieve efficient, automatic provisioning of isolated environments within existing service mesh-based microservices systems. This can facilitate creating a more stable environment, increase development velocity, and make it easier to troubleshoot and validate critical production issues.

Example Architectures

FIG. 1 illustrates an example system architecture 100 that can facilitate isolated environment provisioning in service mesh-based microservices systems, in accordance with an embodiment of this disclosure.

System architecture 100 comprises server 102, communications network 104, and client computer 106. In turn, server 102 comprises isolated environment provisioning in service mesh-based microservices systems component 108, service mesh 110, isolated environment 112A, and isolated environment 112B.

Figure 13:
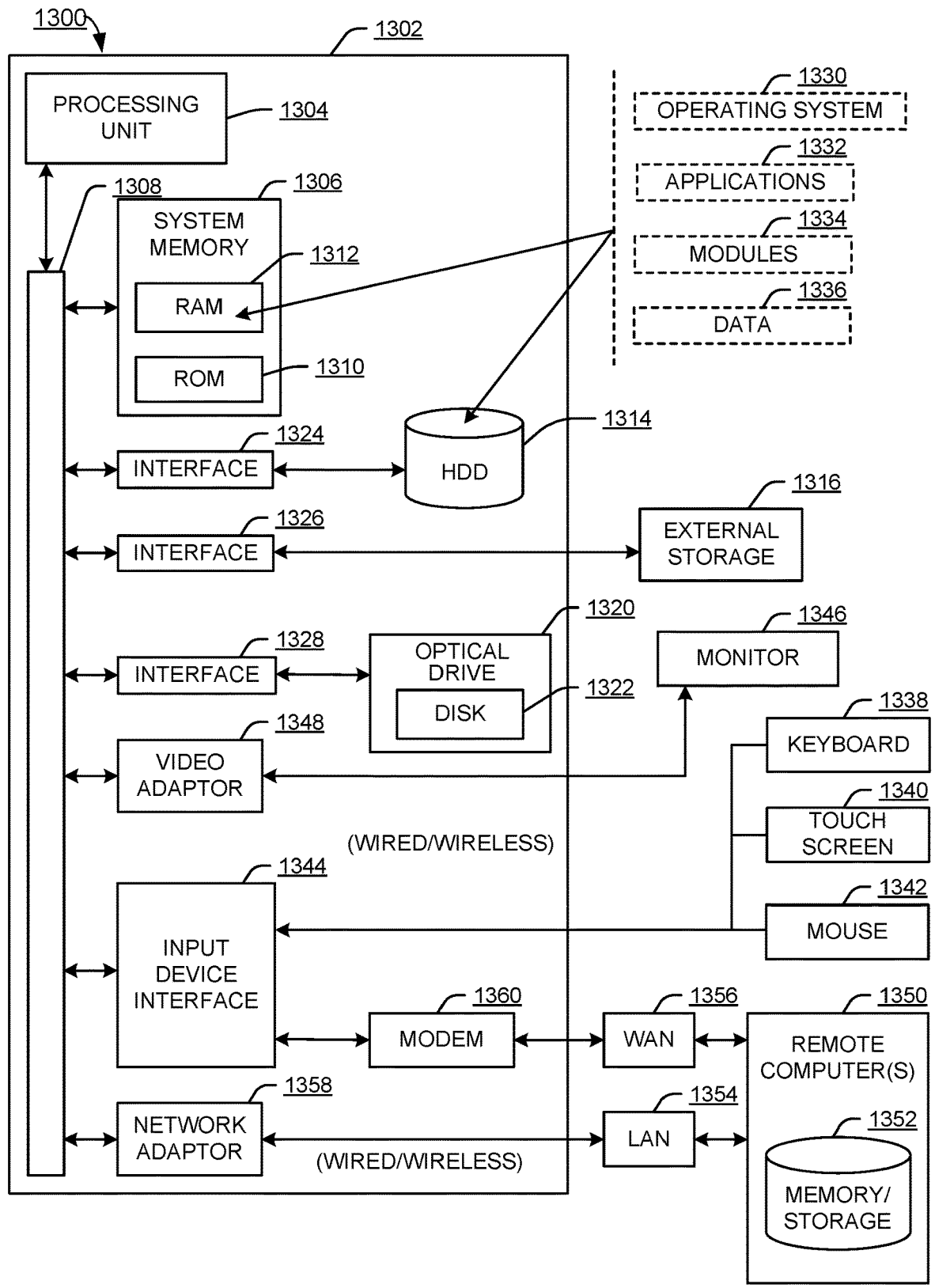
FIG. 13 illustrates an example block diagram of a computer operable to execute an embodiment of this disclosure.

Each of server 102 and/or client computer 106 can be implemented with part(s) of computing environment 1300 of FIG. 13. Communications network 104 can comprise a computer communications network, such as the Internet.

Server 102 can host a service that comprises a group of microservices, and do so within service mesh 110. Isolated environment provisioning in service mesh-based microservices systems component 108 can receive a changeset for one of those microservices from client computer 106. This changeset can be associated with a user account that submitted the changeset to server 102.

Isolated environment provisioning in service mesh-based microservices systems component 108 can maintain both a current version of a microservice and instantiate an updated version of the microservice from the changeset. Then, requests from user accounts other than the user account that submitted the changeset can be routed through the current version of the microservice (e.g., as part of isolated environment 112A), and requests from the user account that submitted the changeset can be routed through the updated version of the microservice (e.g., as part of isolated environment 112B).

Additionally, as part of instantiating the updated version of the microservice, provisioning in service mesh-based microservices systems component 108 can determine that the new version of the microservice will be depended upon by another microservice (which can be referred to as a dependent microservice). In some examples, this determination can be made because an instance of the dependent microservice depends on the current version of the microservice. In other examples, this determination can be made based on user input data of the dependent microservice, or static analysis of the changeset (e.g., because the changeset introduces a new dependency).

Based on this determination, provisioning in service mesh-based microservices systems component 108 can provision another instance of the dependent microservice, which can be made part of isolated environment 112B along with the updated version of the microservice. Calls by the updated version of the microservice to the dependent microservice can be directed to this new instance of the dependent microservice in isolated environment 112B.

Isolated environment 112A and isolated environment 112B can be referred to as "isolated environments" because they host respective different versions of the microservice in question, where the two versions of the microservice do not interact, and where requests can be routed to one of the two microservice versions, but not both.

In some examples, isolated environment provisioning in service mesh-based microservices systems component 108 can implement part(s) of the process flows of FIGS. 4-12 to implement isolated environment provisioning in service mesh-based microservices systems.

It can be appreciated that system architecture 100 is one example system architecture for isolated environment provisioning in service mesh-based microservices systems, and that there can be other system architectures that facilitate isolated environment provisioning in service mesh-based microservices systems.

Figure 2:
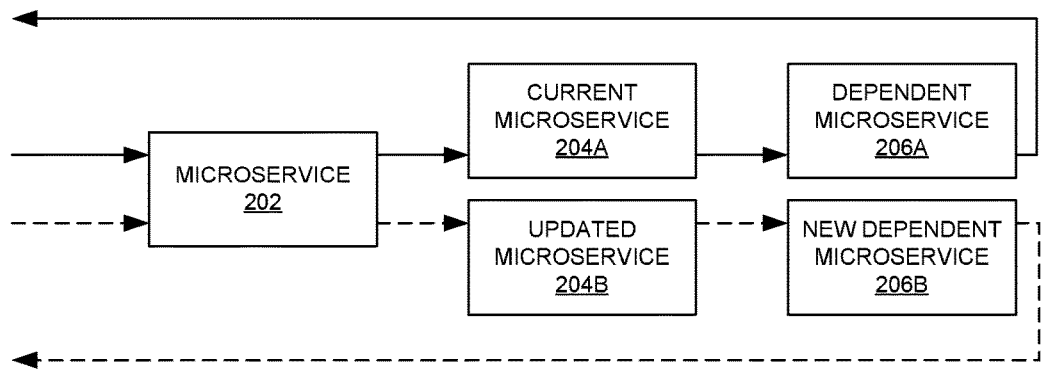
FIG. 2 illustrates another example system architecture that can facilitate isolated environment provisioning in service mesh-based microservices systems, in accordance with an embodiment of this disclosure.

FIG. 2 illustrates another example system architecture 200 that can facilitate isolated environment provisioning in service mesh-based microservices systems, in accordance with an embodiment of this disclosure. In some examples, part(s) of system architecture 200 can be used to implement a microservices architecture that is hosted by server 102 of FIG. 1 in service mesh 110.

System architecture 200 comprises isolated environment provisioning in service mesh-based microservices systems component 208 (which can be similar to isolated environment provisioning in service mesh-based microservices systems component 108 of FIG. 1), microservice 202, current microservice 204A, updated microservice 204B, and microservice 206, current dependent microservice 208A, and new dependent microservice 208B.

Each of microservice 202, current microservice 204A, updated microservice 204B, dependent microservice 206A, and new dependent microservice 206B can comprise a computer service that is configured to interact with other microservice(s) via a service mesh to provide a service. A service mesh can generally comprise a dedicated infrastructure layer that facilitates transparently adding capabilities like observability, traffic management, and security without adding them to the code of microservices that run in the service mesh.

Updated microservice 204B can represent an updated version of current microservice 204A, and both can be in operation concurrently. One isolated environment (e.g., isolated environment 112A of FIG. 1) can then comprise microservice 202, current microservice 204A, and dependent microservice 206A (with a data flow indicated by the solid line between these components). Another isolated environment (e.g., isolated environment 112B of FIG. 1) can then comprise microservice 202, updated microservice 204B, and new dependent microservice 206B (with a data flow indicated by the dashed line between these components). These two isolated environments can be in effect concurrently.

Figure 3:
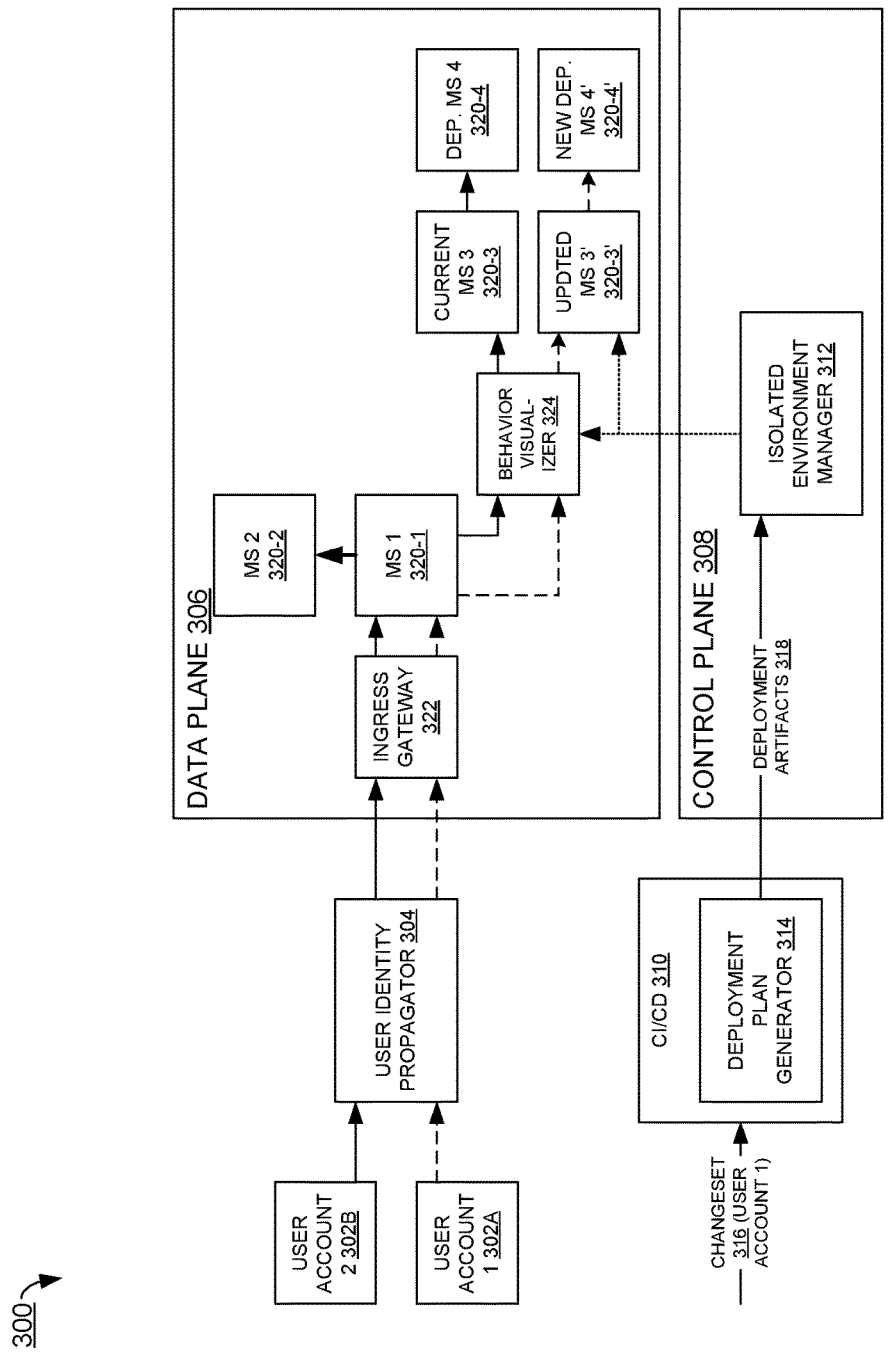
FIG. 3 illustrates another example system architecture that can facilitate isolated environment provisioning in service mesh-based microservices systems, in accordance with an embodiment of this disclosure.

FIG. 3 illustrates another example system architecture 300 that can facilitate isolated environment provisioning in service mesh-based microservices systems, in accordance with an embodiment of this disclosure. In some examples, part(s) of system architecture 300 can be used to implement part(s) of system architecture 100 of FIG. 1.

System architecture 300 comprises user account 1 202A and user account 2 202B (which can comprise user account identities in a computing service or device), user identity propagator 304, data plane 306, control plane 308, CI/CD 310, isolated environment manager 312, deployment plan generator 314, changeset 316, deployment artifacts 318, microservice 1 320-1, microservice 2 320-2, current microservice 3 320-3, updated microservice 3' 320-3', dependent microservice 4 320-4, new dependent microservice 4' 320-4' ingress gateway 322, and behavior visualizer 324.

User identity propagator 304 can receive an indication of user account 1 302A and/or user account 2 302B and propagate that user identity through the service mesh of data plane 306 so that routing decisions among isolated environments can be made based on user identity. Data plane 306 and control plane 308 can be parts of a service mesh, where data plane 306 carries out policies for microservices in a service mesh (e.g., routing decisions) that are defined by control plane 308.

CI/CD 310 can comprise a continuous integration/continuous delivery service that is configured to integrate changes to the microservices of data plane 306 into data plane 306, and to facilitate deploying those changes to data plane 306. Isolated environment manager 312 can determine routing policies for data plane 306 so that multiple versions of a microservice can coexist in separate isolated environments.

Deployment plan generator 314 can be configured to create deployment artifacts (e.g., deployment artifacts 318) from a changeset (e.g., changeset 316), and these deployment artifacts can be used to set routing policies by isolated environment manager 312. Changeset 316 can comprise a changeset for current microservice 3 320-3 (to create updated microservice 3' 320-3') that is submitted by user account 1 302A.

Ingress gateway 322 can be configured to load balance incoming requests to a service mesh architecture of data plane 306. Behavior visualizer 324 can be configured to visualize behavior a service mesh architecture of data plane 306 after applying virtual service and destination rules that are generated based on deployment artifacts 318.

Microservice 1 320-1, microservice 2 320-2, current microservice 3 320-3, updated microservice 3' 320-3', and microservice 4 320-4 can each be microservices in a service mesh architecture of data plane 306. Updated microservice 3' 320-3' can comprise an updated version of current microservice 3 320-3, and there can be separate isolated environments for updated microservice 3' 320-3' and current microservice 3 320-3.

Put another way, changeset 316 and an identifier of user account 1 302A can be received by deployment plan generator 314, which can generate deployment artifacts 31. Isolated environment manager 312 can receive deployment artifacts 318 and apply them in order to create updated microservice 3' 320-3', as well as adjust routing rules so that traffic of user account 1 302A can be routed to updated microservice 3' 320-3'.

Isolated environment manager can also create new dependent microservice 4' 320-4' as part of creating updated microservice 3' 320-3', as well as adjust routing rules so that traffic of user account 1 302A can be routed to new dependent microservice 4' 320-4' (as opposed to routed to current dependent microservice 4 320-4). In this manner, there can be separate isolated environments for new dependent microservice 4' 320-4' (with updated microservice 3' 320-3') and current dependent microservice 4 320-4 (with current microservice 3 320-3).

User account 1 302A and user account 2 302B can execute flows and their corresponding user names can be propagated by user identity propagator 304. So, user account 1 302A can be routed within its isolated environment that includes instances of microservice 1 320-1, microservice 2 320-2, updated microservice 3' 320-3', and microservice 4 320-4 through the chain microservice 1 320-1, updated microservice 3' 320-3', and microservice 4 320-4. Then user account 2 302B can be routed within its isolated environment that includes instances of microservice 1 320-1, microservice 2 320-2, updated microservice 3 320-3, and microservice 4 320-4 through the chain microservice 1 320-1, updated microservice 3 320-3, and microservice 4 320-4.

A high-level flow can be as follows. Deployment plan generator 314 can be installed in CI/CD 310. Deployment plan generator 314 can generate artifacts (e.g., deployment artifacts 318) needed by the service mesh and deployment orchestrator for creation of a changed microservice's instance (e.g., updated microservice 3' 320-3'), and for routing traffic for the user that made the change to the changed microservice's instance.

Isolated environment manager 312 can be installed in control plane 308 of the service mesh, and apply service mesh artifacts that are received from the deployment plan generator. Service mesh artifacts can comprise, e.g., a YAML or JSON file. Service mesh artifacts can reference a microservice image that an instance of a microservice is to be created from, as well as additional information such as what labels to put and how many instances to process.

User identity propagator 304 can be installed as a plugin within a web browser, and can pass a user name of a logged in user as a special header value so that routing rules created by the deployment plan generator can act upon the header value in order to route the traffic to the changed microservice instance (e.g., updated microservice 3' 320-3') only for a user who made the change.

That is, relative to a prior system architecture, changes can be introduced to a CI/CD process, a service mesh, and a running application to integrate between those three systems in order to achieve automatic provisioning of the isolated environment.

Generating a deployment plan can be performed as follows. Deployment plan generator 314 can be installed in CI/CD 310. A developer submitting the changes can pass a <username> (which can be later used to login to the application) to CI/CD 310 as an input. Deployment plan generator 314 can receive the <username> from CI/CD 310, and can generate service mesh artifacts (e.g., deployment artifacts 318; in some examples, these can be files in a human-readable format, such as Yet Another Markup Language (YAML) or JavaScript Object Notation (JSON) files) that can allow creating a new instance of the microservice, where the new instance is marked with a special label. The value of this label can be set to <username>.

In addition, deployment plan generator 314 can generate artifacts in deployment artifacts 318 that are used to adjust routing rules to allow only traffic with a special header that matches the label to reach the changed microservice instance.

Note that a service mesh can generally comprise a dedicated infrastructure layer that allows transparently adding capabilities, like observability, traffic management, and security without adding them to microservices code. With the present techniques, a service mesh's traffic management capability can be used in order to create an isolated environment for a target user.

The following example can illustrate the present techniques, as they relate to artifacts generation for creating an isolated environment for user test_user1. This can be an orchestration deployment artifact that is intended for use for any user in its application, so its label named "user" has a value of "any." The image name can be jsmith/orders:

```
kind: Deployment
metadata:
    name: orders
spec:
    replicas: 1
    selector:
        matchLabels:
            app: orders
    template:
        metadata:
            labels:
                app: orders
                user: any
        spec:
            containers:
            -   name: orders
                image: jsmith/orders
                ports:
                -   containerPort: 8080
```

The following can be an orchestration deployment artifact that is created specifically for test_user1, so its label named "user" has value "test_user1." The image of the microservice here is named jsmith/orders-v2—it contains a change that was submitted by a user who will validate the change using username "test_user1."

```
kind: Deployment
metadata:
    name: orders
spec:
    replicas: 1
    selector:
        matchLabels:
            app: orders
    template:
        metadata:
            labels:
                app: orders
                user: test_user1
        spec:
            containers:
            -   name: orders
                image: jsmith/orders-v2
                ports:
                -   containerPort: 8080
```

The following can be a service mesh destination rule artifact that facilitates dividing incoming traffic to subsets. Here, traffic can be divided using a "user" label that is presented in the orchestrator's deployment artifact listed above. So, here, a new subset named "test_user1" is added to an existing destination rule.

```
kind: DestinationRule
metadata:
    name: orders-destination-rule
spec:
    host: orders-svc
    subsets:
        name: test_user1
        labels:
            user: test_user1
        name: any
        labels:
            user: any
```

The following can be a service mesh's virtual service artifact. A part can be added that permits checking for a value of an end-user header, and if it is equal to test_user1, then the traffic can be routed to a subset named test_user1. This can mean that traffic will reach the microservice created off the image jsmith/orders-v2 that contains the change introduced by the user testing with test_user1.

```
kind: VirtualService
metadata:
    name: reviews
spec:
    hosts:
    -   reviews
    http:
    -   match:
        -   headers:
                end-user:
                    exact: test_users1
        route:
        -   destination:
                host: orders-svc
                subset: test user1
    -   route:
        -   destination:
                host: orders-svc
                subset: any
```

Isolated environment management can be performed as follows. An isolated environment manager can be installed in a control plane of the service mesh and can apply the service mesh artifacts received from the deployment plan generator in order to provision the new microservice instance with the required label, and adjust routing rules accordingly.

Later, when a user finishes its tasks within the environment, the isolated environment manager can be used to revert back all changes that were applied to create the isolated environment.

So, in the case of the previous example, to revert back all the changes can mean removing the corresponding snippets from a virtual service, destination rule and redeploy those artifacts, then apply the removal of the corresponding orchestration deployment file. That is, the changes can be applied in a reverse order as a creation flow. For removing the isolated environment, it can be that all the configuration changes related to it are removed, and apply this so that service mesh adjusts accordingly. For example, where the virtual service has a specific configuration per test_user1—it can be removed and the service mesh can be informed that it is no longer relevant. That is, this can be removed from deployment artifacts:

```
http:
  match:
    headers:
      end-user:
        exact: test_users1
  route:
    destination:
      host: orders-svc
      subset: test_user1
```

Similarly, this can be removed from deployment artifacts for a destination rule:

```
subsets:
  name: test_user1
  labels:
    user: test_user1
```

A user identity can be propagated as follows. A user identity propagator can be installed as a plugin within a web browser, or in addition to an application itself. The user identity propagator can take a <username> that was used to login, and can set a dedicated header named end-user with a value equal to <username>.

An end-user header can be propagated between microservices that are participating in the call chain. For this purpose, a dedicated interceptor can be used that can catch an incoming request, fetch an end-user header, and put it on an outgoing request.

An alternative approach can be to take a dedicated library, and configure it to handle an end-user header.

It can be that each flow originating from a browser can include an end-user header with the <username> value above. The value of the header can be consumed by routing rules generated by the deployment plan generator in order to route the traffic of the logged in <username> to its own dedicated microservice instances that were created previously through the corresponding deployment.

It can be that some service meshes can deduce a user from tokens (e.g., JSON web tokens (JWT tokens), and use those for routing.

Example Graphs

Figure 4:
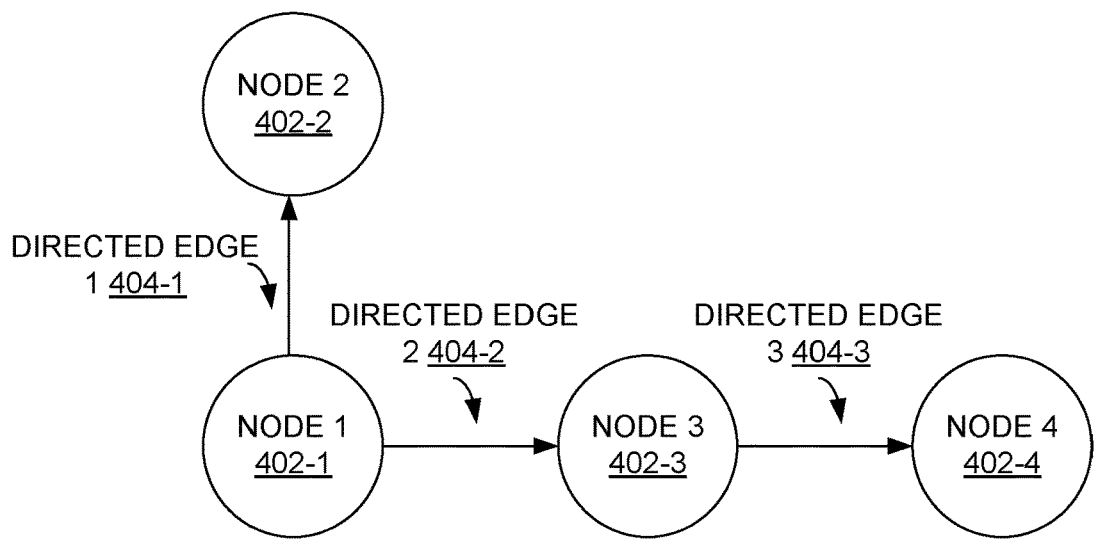
FIG. 4 illustrates an example service mesh graph that can facilitate isolated environment provisioning in service mesh-based microservices systems, in accordance with an embodiment of this disclosure.

FIG. 4 illustrates an example service mesh graph 400 that can facilitate isolated environment provisioning in service mesh-based microservices systems, in accordance with an embodiment of this disclosure. In some examples, part(s) of service mesh graph 400 can be used by isolated environment provisioning in service mesh-based microservices systems component 108 of FIG. 1 to facilitate isolated environment provisioning in service mesh-based microservices. Relative to service mesh graph 500 of FIG. 5, service mesh graph 400 can represent an example full service mesh graph, while service mesh graph 500 represents a subset of service mesh graph 400 that identifies dependencies for a particular microservice. In some examples, service mesh graph 500 can be derived from service mesh graph 400.

Service mesh graph 400 comprises a plurality of nodes and edges that connect the nodes. This can be distinguished from other types of graphs, such as those where values are plotted in two-dimensional coordinate system.

In an example, a graph of the microservices can be generated based on a structure of API dependencies between the microservices. An approach to generating such an API graph can utilize tools that adapt a service mesh. A service mesh can generally describe a network of microservices that make up a distributed application, and interactions between these microservices. As a service mesh grows in size and complexity, it can become harder to understand and manage. There can be tools that allow control over a service mesh, and provide behavioral insights and operational insights over the service mesh as a whole.

A graph can be generated to represent a network structure. In a graph, a directed edge (u,v) can represent a scenario where microservice v consumes an API from microservice u. Put another way, microservice v can be a consumer and microservice u can be a producer in this relationship. In examples, u and v in the graph can be referred to as nodes of the graph.

Service mesh graph 400 can represent a network of a microservices environment. In an example, outgoing degree-centrality can be used for a centrality score. As depicted, service mesh graph 400 is composed of four nodes, which each correspond to a microservice of system architecture 300 of FIG. 3.

Service mesh graph 400 can represent the graph before the isolated environment of microservice 3' 320-3' and microservice 4' 320-4' of FIG. 3 created (and those microservices instantiated), so can omit representing those nodes. Service mesh graph 400 comprises node 1 402-1 (corresponding to microservice 1 320-1), node 2 402-2 (corresponding to microservice 2 320-2), node 3 402-3 (corresponding to microservice 3 320-3), and node 4 402-4 (corresponding to microservice 4 320-4).

Service mesh graph 400 also comprises a plurality of directed edges between nodes, and these directed edges can correspond to data flow in system architecture 300. service mesh graph 400 comprises directed edge 1 404-1 (which represents data flow from microservice 1 320-1 to microservice 2 320-2), directed edge 2 404-2 (which represents data flow from microservice 1 320-1 to microservice 3 320-3), and directed edge 3 404-3 (which represents data flow from microservice 3 320-3 to microservice 4 320-4).

Figure 5:
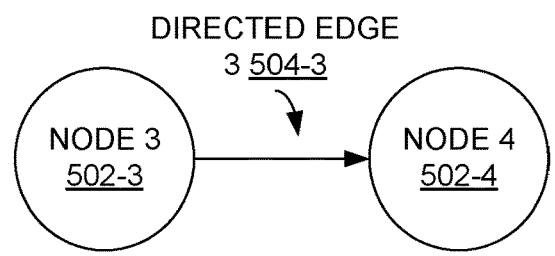
FIG. 5 illustrates another example service mesh graph that can facilitate isolated environment provisioning in service mesh-based microservices systems, in accordance with an embodiment of this disclosure.

FIG. 5 illustrates another example service mesh graph 500 that can facilitate isolated environment provisioning in service mesh-based microservices systems, in accordance with an embodiment of this disclosure. In some examples, part(s) of service mesh graph 500 can be used by isolated environment provisioning in service mesh-based microservices systems component 108 of FIG. 1 to facilitate isolated environment provisioning in service mesh-based microservices. Relative to service mesh graph 400 of FIG. 4, service mesh graph 500 can represent a subset of service mesh graph 400, where service mesh graph 500 represents a subset of service mesh graph 400 that identifies dependencies for a particular microservice. In some examples, service mesh graph 500 can be derived from service mesh graph 400.

Service mesh graph 500 comprises node 3 502-3 (corresponding to node 3 402-3 of FIG. 4), and node 4 502-4

(corresponding to node 4 420-4). Service mesh graph 500 also comprises directed edge 3 504-3 (which corresponds to directed edge 3 404-3), Example Process Flows FIG. 6 illustrates an example process flow 600 that can facilitate isolated environment provisioning in service mesh-based microservices systems, in accordance with an embodiment of this disclosure. In some examples, one or more embodiments of process flow 600 can be implemented by isolated environment provisioning in service mesh-based microservices systems component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 604 depicts receiving a changeset for an updated microservice and an identifier of a user account that is configured to access the updated microservice, wherein the updated microservice represents an updated version relative to a current version of a microservice, and wherein the current version of the microservice is deployed to a service mesh that comprises a group of microservices. Using the example of FIG. 3, this can comprise user account 302A uploading changeset 316, where changeset is associated with user account 302A. The updated microservice can be updated microservice 3' 320-3' (though not yet instantiated into the service mesh of data plane 306 at this point), with the current version of the microservice being updated microservice 3 320-3.

After operation 604, process flow 600 moves to operation 606.

Operation 606 depicts instantiating the updated microservice to the service mesh based on the changeset. Continuing with the example of FIG. 3, this can comprise instantiating updated microservice 3' 320-3' so that it runs in the service mesh of data plane 306.

After operation 606, process flow 600 moves to operation 608.

Operation 608 depicts, in response to determining that a first instance of a dependent microservice depends on the current version of the microservice, instantiating a second instance of the dependent microservice. Using the example of FIG. 3, the first instance of the dependent microservice can be dependent microservice 4 320-4, and the second instance of the dependent microservice can be new dependent microservice 4' 320-4'.

In some examples, the instantiating the second instance of the dependent microservice is performed in response to receiving user input data indicative of instantiating dependent microservices for the updated microservice. That is, it can be an optional decision for the user account that deploys the changeset as to whether dependent services are handled.

In some examples, determining that the first instance of the dependent microservice depends on the current version of the microservice is based on analyzing a graph of the service mesh. That is, from a service mesh graph, a whole graph of dependencies of a current microservice (or group of microservices) can be determined.

In some examples, the dependent microservice is part of a subgraph of the graph of the service mesh. That is, where the graph of the service mesh is similar to service mesh graph 400 of FIG. 4, the subgraph can be similar to service mesh graph 500 of FIG. 5.

After operation 608, process flow 600 moves to operation 610.

Operation 610 depicts updating routing rules for the service mesh to indicate that any traffic in the service mesh that is associated with the user account and that is directed to the current version of the microservice is to be routed to the updated microservice, and any traffic directed from the updated microservice to the first instance of the dependent microservice is to be routed to the second instance of the dependent microservice. Continuing with the example of FIG. 3, this can comprise routing rules that are defined by isolated environment manager 312 and that affect how data is routed within data plane 306.

After operation 610, process flow 600 moves to operation 612.

Operation 612 depicts, in response to receiving traffic determined to be associated with the user account and directed to the current version of the microservice, routing the traffic to the updated microservice instead of routing the traffic to the current version of the microservice.

Continuing with the example of FIG. 3, where user account 1 302A generates traffic to access the microservices, it can be routed to microservice 1 320-1, then to updated microservice 3' 320-3', then to new dependent microservice 4' 320-4'. In contrast, where user account 2 302B generates traffic to access the microservices, it can be routed to microservice 1 320-1, then to updated microservice 3 320-3 (rather than updated microservice 3' 320-3'), then to dependent microservice 4 320-4 (rather than new dependent microservice 4' 320-4'). In this manner, two isolated environments—one that includes current microservice 3 320-3 and dependent microservice 4 320-4, and another that includes updated microservice 3' 320-3' and new dependent microservice 4' 320-4'—can be formed in the service mesh of data plane 306.

In some examples, the traffic is first traffic, and operation 612 comprises, in response to receiving second traffic originated by the updated microservice and directed to the first instance of the dependent microservice, routing the second traffic to the second instance of the dependent microservice. In some examples, the routing of the second traffic to the second instance of the dependent microservice is based on determining that the second traffic is associated with the user account. That is, routing traffic can also comprise routing traffic to the new instance of the dependent microservice. This routing can be performed per given user.

After operation 612, process flow 600 moves to 614, where process flow 600 ends.

FIG. 7 illustrates an example process flow 700 that can facilitate isolated environment provisioning in service mesh-based microservices systems, in accordance with an embodiment of this disclosure. In some examples, one or more embodiments of process flow 700 can be implemented by isolated environment provisioning in service mesh-based microservices systems component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts, in response to determining that the first instance of the dependent microservice accesses a first instance of a data store, provisioning a second instance of the data store. That is, where a dependent microservice accesses a data store (e.g., a database), another instance of that data store can be provisioned and operated in an isolated environment that includes the new instance of the dependent microservice.

After operation 704, process flow 700 moves to operation 706.

Operation 706 depicts configuring the second instance of the dependent microservice to access the second instance of the data store. In some examples, this comprises making a uniform resource locator (URL) of the second instance of the data store accessible to the second instance of the dependent microservice. That is, a data store can have access parameters (e.g., a URL to address the data store, and/or a username and password as credentials for the data store), and these can be provided to the second instance of the dependent microservice as part of provisioning the second instance of the dependent microservice.

In some examples, a data store can be accessed with a unique URL, in contrast to examples where a new instance of a dependent microservice is accessed by updating routing rules.

After operation 706, process flow 700 moves to 708, where process flow 700 ends.

FIG. 8 illustrates an example process flow 800 that can facilitate isolated environment provisioning in service mesh-based microservices systems, in accordance with an embodiment of this disclosure. In some examples, one or more embodiments of process flow 800 can be implemented by isolated environment provisioning in service mesh-based microservices systems component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

Operation 804 depicts receiving a changeset for an updated microservice and an identifier of a user account, wherein the updated microservice is representative of an update to a current version of a microservice that is deployed to a service mesh. In some examples, operation 804 can be implemented in a similar manner as operation 404 of FIG. 4.

After operation 804, process flow 800 moves to operation 806.

Operation 806 depicts deploying the updated microservice to the service mesh based on the changeset. In some examples, operation 806 can be implemented in a similar manner as operation 406 of FIG. 4.

After operation 806, process flow 800 moves to operation 808.

Operation 808 depicts, in response to determining that a first instance of a dependent microservice depends on the current version of the microservice, deploying a second instance of the dependent microservice to the service mesh. In some examples, operation 808 can be implemented in a similar manner as operation 408 of FIG. 4.

In some examples, determining that the first instance of a dependent microservice depends on the current version of the microservice is based on analyzing a graph of the service mesh. That is, determining that the first instance of a dependent microservice depends on the current version of the microservice can be based on analyzing a graph of the service mesh.

After operation 808, process flow 800 moves to operation 810.

Operation 810 depicts updating routing rules for the service mesh to indicate that first traffic in the service mesh that is associated with the user account and that is directed to the current version of the microservice is to be routed to the updated microservice, and second traffic directed from the updated microservice to the first instance of the dependent microservice is to be routed to the second instance of the dependent microservice. In some examples, operation 810 can be implemented in a similar manner as operation 410 of FIG. 4.

After operation 810, process flow 800 moves to operation 812.

Operation 812 depicts, in response to receiving traffic that is associated with the user account and that is directed to the current version of the microservice, routing the traffic to the updated microservice while foregoing routing the traffic to the current version of the microservice. In some examples, operation 812 can be implemented in a similar manner as operation 412 of FIG. 4.

After operation 812, process flow 800 moves to 814, where process flow 800 ends.

FIG. 9 illustrates an example process flow 900 that can facilitate isolated environment provisioning in service mesh-based microservices systems, in accordance with an embodiment of this disclosure. In some examples, one or more embodiments of process flow 900 can be implemented by isolated environment provisioning in service mesh-based microservices systems component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts determining that a second dependent microservice depends on the updated microservice based on performing a static analysis of the changeset. That is, an approach to identifying a dependent microservice can involve static analysis of computer code in the changeset.

In some examples, the second dependent microservice omits a dependency on the current version of the microservice. That is, this can be implemented, for instance, where the changeset introduces a new interaction with a dependent microservice that is not present in the current service mesh.

After operation 904, process flow 900 moves to operation 906.

Operation 906 depicts deploying an instance of the second dependent microservice to the service mesh. That is, a new instance of this second dependent microservice identified in operation 904 can be deployed as part of handling dependent services.

After operation 906, process flow 900 moves to 908, where process flow 900 ends.

Figure 10:
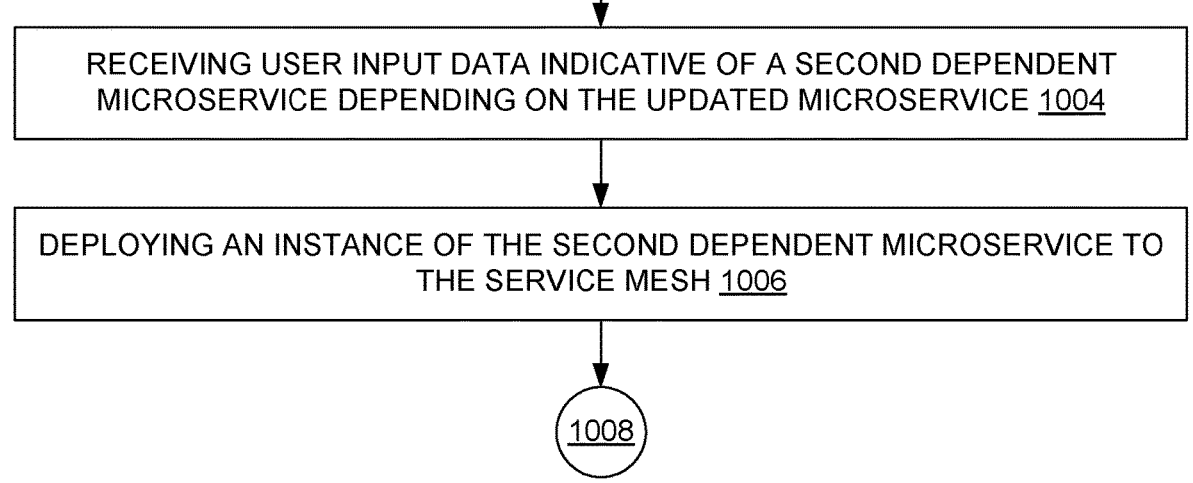
FIG. 10 illustrates another example process flow that can facilitate isolated environment provisioning in service mesh-based microservices systems, in accordance with an embodiment of this disclosure.

FIG. 10 illustrates an example process flow 1000 that can facilitate isolated environment provisioning in service mesh-based microservices systems, in accordance with an embodiment of this disclosure. In some examples, one or more embodiments of process flow 1000 can be implemented by isolated environment provisioning in service mesh-based microservices systems component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts receiving user input data indicative of a second dependent microservice depending on the updated microservice. That is, an approach to identifying a dependent microservice can involve a user account identifying dependencies, such as dependencies that are added as part of a changeset.

In some examples, the second dependent microservice omits a dependency on the current version of the microservice. That is, this can be implemented, for instance, where the changeset introduces a new interaction with a dependent microservice that is not present in the current After operation 1004, process flow 1000 moves to operation 1006.

Operation 1006 depicts deploying an instance of the second dependent microservice to the service mesh. That is, a new instance of this second dependent microservice identified in operation 904 can be deployed as part of handling dependent services.

After operation 1004, process flow 1000 moves to 1008, where process flow 1000 ends.

FIG. 11 illustrates an example process flow 1100 that can facilitate isolated environment provisioning in service mesh-based microservices systems, in accordance with an embodiment of this disclosure. In some examples, one or more embodiments of process flow 1100 can be implemented by isolated environment provisioning in service mesh-based microservices systems component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts, based on receiving an identifier of a user account and a changeset applicable to generate an updated microservice relative to a current version of a microservice that is deployed to a service mesh, deploying the updated microservice to the service mesh. In some examples, operation 1104 can be implemented in a similar manner as operations 604-606 of FIG. 6.

In some examples, the service mesh comprises an infrastructure layer for a group of microservices that comprises the updated microservice and the current version of the microservice. That is, a service mesh can comprise a dedicated infrastructure layer that allows to transparently add capabilities like observability, traffic management and security without adding them to your own code.

After operation 1104, process flow 1100 moves to operation 1106.

Operation 1106 depicts, in response to determining that a first instance of a dependent microservice depends on the current version of the microservice, deploying a second instance of the dependent microservice to the service mesh. In some examples, operation 1106 can be implemented in a similar manner as operation 608 of FIG. 6.

After operation 1106, process flow 1100 moves to operation 1108.

Operation 1108 depicts updating routing rules for the service mesh to indicate that any first portions of traffic in the service mesh that are associated with the user account and that are directed to the current version of the microservice are to be routed to the updated microservice, and any second portions of traffic in the service mesh that are directed from the updated microservice to the first instance of the dependent microservice are to be routed to the second instance of the dependent microservice. In some examples, operation 1108 can be implemented in a similar manner as operation 610 of FIG. 6.

After operation 1108, process flow 1100 moves to operation 1110.

Operation 1110 depicts, in response to receiving first traffic of the traffic, wherein the first traffic is determined to be associated with the user account and determined to be directed to the current version of the microservice, routing the first traffic to the updated microservice instead of routing the first traffic to the current version of the microservice. In some examples, operation 1110 can be implemented in a similar manner as operation 612 of FIG. 6.

After operation 1110, process flow 1100 moves to 1112, where process flow 600 ends.

Figure 12:
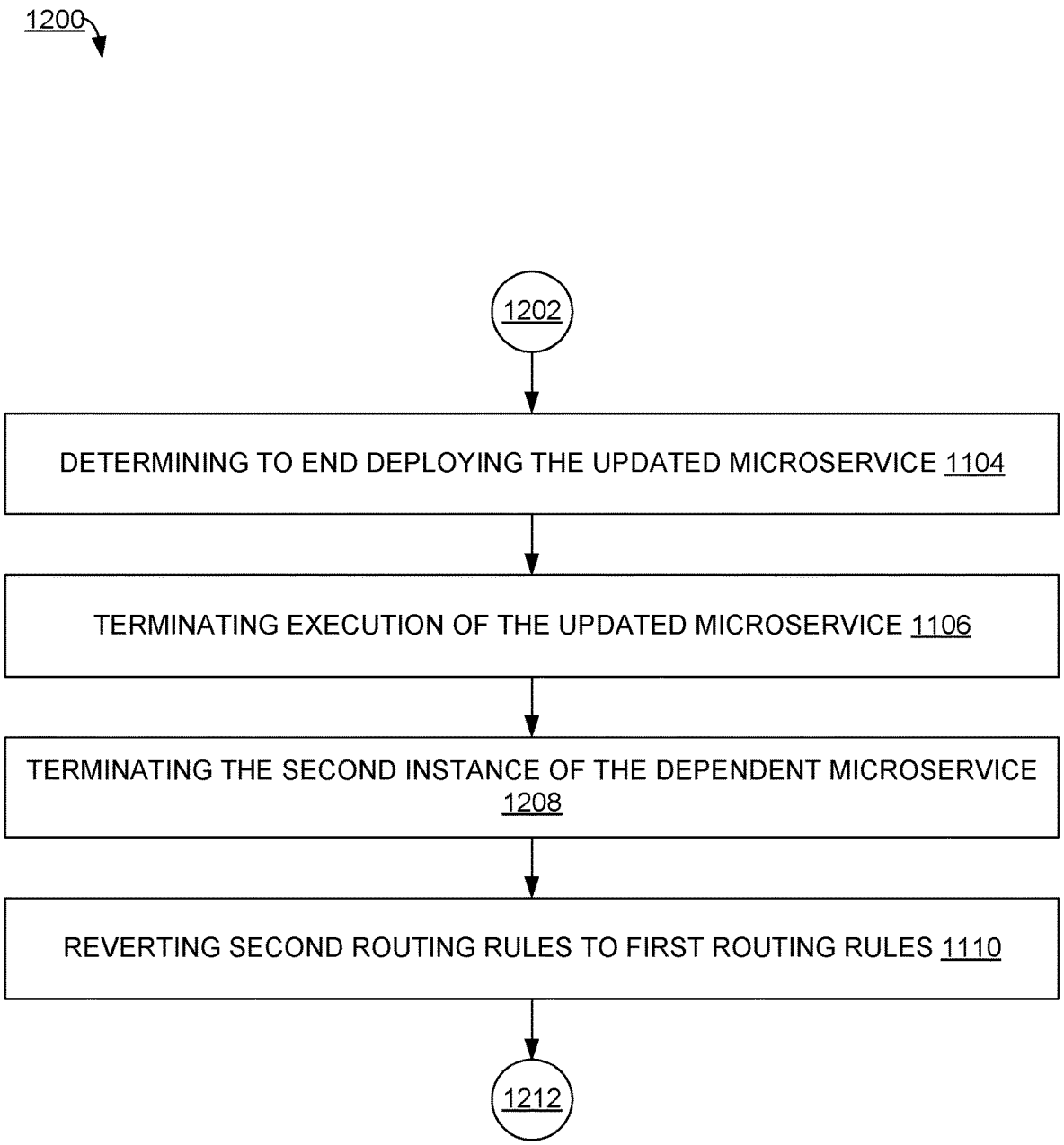
FIG. 12 illustrates another example process flow that can facilitate isolated environment provisioning in service mesh-based microservices systems, in accordance with an embodiment of this disclosure.

FIG. 12 illustrates an example process flow 1200 that can facilitate isolated environment provisioning in service mesh-based microservices systems, in accordance with an embodiment of this disclosure. In some examples, one or more embodiments of process flow 1200 can be implemented by isolated environment provisioning in service mesh-based microservices systems component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 determining to end deploying the updated microservice. In some examples, operation 1204 comprises, after routing the traffic, determining to end deploying the updated microservice. That is, at a certain point, a user account that deploys the updated microservice can be finished with the updated microservice, and certain operations can be performed to revert back changes that were applied to create an isolated environment.

After operation 1204, process flow 1200 moves to operation 1206.

Operation 1206 depicts terminating execution of the updated microservice. That is, terminating execution of the updated microservice can be performed as part of reverting back changes.

After operation 1206, process flow 1200 moves to operation 1208.

Operation 1208 depicts terminating the second instance of the dependent microservice. That is, terminating the second instance of the dependent microservice can be performed as part of reverting back changes.

After operation 1208, process flow 1200 moves to operation 1210.

Operation 1210 depicts reverting the second routing rules to the first routing rules. That is, reverting back routing rules can be performed as part of reverting back changes, where the first routing rules were transformed to second routing rules as part of instantiating the updated microservice.

In some examples, operation 1210 comprises, in response to receiving second traffic of the traffic, wherein the second traffic is determined not to be associated with the user account and is determined to be directed to the current version of the microservice, routing the second traffic to the current version of the microservice instead of routing the second traffic to the updated microservice. That is, additional traffic to the microservices can be received, and this traffic can come from a user account not associated with the changeset used to instantiate the updated microservice. Where traffic comes from a user account not associated with the changeset used to instantiate the updated microservice, that traffic can be routed to the current version of the microservice (which accesses the first instance of the data store, rather than the second instance of the data store).

In some examples, the updated microservice is part of a first isolated environment of the service mesh, the current version of the microservice is part of a second isolated environment of the service mesh, the first isolated environment is configured to receive the first traffic and is configured to exclude second traffic of the traffic, and the second isolated environment is configured to receive the second traffic and is configured to exclude the first traffic.

In some examples, operation 1210 comprises, in response to receiving second traffic originated by the updated microservice and directed to the first instance of the dependent microservice, routing the second traffic to the second instance of the dependent microservice. That is, traffic from the updated microservice can be routed to the second instance of the dependent microservice (which was instantiated as part of instantiating the updated microservice), rather than to the (preexisting) first instance of the dependent microservice.

After operation 1210, process flow 1200 moves to 1212, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of server 102 and/or client computer 106 of FIG. 1.

In some examples, computing environment 1300 can implement one or more embodiments of the process flows of FIGS. 4-12 to facilitate isolated environment provisioning in service mesh-based microservices systems.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory coupled to the processor, comprising instructions that, in response to execution by the processor, cause the system to perform operations, comprising:
      receiving a changeset for an updated microservice and an identifier of a user account that is configured to access the updated microservice, wherein the updated microservice represents an updated version relative to a current version of a microservice, and wherein the current version of the microservice is deployed to a service mesh that comprises a group of microservices;
      instantiating the updated microservice to the service mesh based on the changeset;
      in response to determining that a first instance of a dependent microservice depends on the current version of the microservice, instantiating a second instance of the dependent microservice;
      updating routing rules for the service mesh to indicate that
         any traffic in the service mesh that is associated with the user account and that is directed to the current version of the microservice is to be routed to the updated microservice, and
         any traffic directed from the updated microservice to the first instance of the dependent microservice is to be routed to the second instance of the dependent microservice; and
      in response to receiving traffic determined to be associated with the user account and directed to the current version of the microservice, routing the traffic to the updated microservice instead of routing the traffic to the current version of the microservice.

2. The system of claim 1, wherein the instantiating the second instance of the dependent microservice is performed in response to receiving user input data indicative of instantiating dependent microservices for the updated microservice.

3. The system of claim 1, wherein determining that the first instance of the dependent microservice depends on the current version of the microservice is based on analyzing a graph of the service mesh.

4. The system of claim 3, wherein the dependent microservice is part of a subgraph of the graph of the service mesh.

5. The system of claim 1, wherein the traffic is first traffic, wherein the operations further comprise:
   in response to receiving second traffic originated by the updated microservice and directed to the first instance of the dependent microservice, routing the second traffic to the second instance of the dependent microservice.

6. The system of claim 5, wherein the routing of the second traffic to the second instance of the dependent microservice is based on determining that the second traffic is associated with the user account.

7. The system of claim 1, wherein the operations further comprise:
in response to determining that the first instance of the dependent microservice accesses a first instance of a data store, provisioning a second instance of the data store; and
configuring the second instance of the dependent microservice to access the second instance of the data store.

8. The system of claim 7, wherein configuring the second instance of the dependent microservice to access the second instance of the data store comprises:
making a uniform resource locator of the second instance of the data store accessible to the second instance of the dependent microservice.

9. A method, comprising:
receiving, by a system comprising a processor, a changeset for an updated microservice and an identifier of a user account, wherein the updated microservice is representative of an update to a current version of a microservice that is deployed to a service mesh;
deploying, by the system, the updated microservice to the service mesh based on the changeset;
in response to determining that a first instance of a dependent microservice depends on the current version of the microservice, deploying, by the system, a second instance of the dependent microservice to the service mesh;
updating, by the system, routing rules for the service mesh to indicate that
first traffic in the service mesh that is associated with the user account and that is directed to the current version of the microservice is to be routed to the updated microservice, and
second traffic directed from the updated microservice to the first instance of the dependent microservice is to be routed to the second instance of the dependent microservice; and
in response to receiving traffic that is associated with the user account and that is directed to the current version of the microservice, routing, by the system, the traffic to the updated microservice while foregoing routing the traffic to the current version of the microservice.

10. The method of claim 9, wherein determining that the first instance of a dependent microservice depends on the current version of the microservice is based on analyzing a graph of the service mesh.

11. The method of claim 9, wherein the dependent microservice is a first dependent microservice, and further comprising:
determining, by the system, that a second dependent microservice depends on the updated microservice based on performing a static analysis of the changeset; and
deploying, by the system, an instance of the second dependent microservice to the service mesh.

12. The method of claim 11, wherein the second dependent microservice omits a dependency on the current version of the microservice.

13. The method of claim 9, wherein the dependent microservice is a first dependent microservice, and further comprising:
receiving, by the system, user input data indicative of a second dependent microservice depending on the updated microservice; and
deploying, by the system, an instance of the second dependent microservice to the service mesh.

14. The method of claim 13, wherein the second dependent microservice omits a dependency on the current version of the microservice.

15. A non-transitory computer-readable medium comprising instructions that, in response to execution, cause a system comprising a processor to perform operations, comprising:
based on receiving an identifier of a user account and a changeset applicable to generate an updated microservice relative to a current version of a microservice that is deployed to a service mesh, deploying the updated microservice to the service mesh;
in response to determining that a first instance of a dependent microservice depends on the current version of the microservice, deploying a second instance of the dependent microservice to the service mesh;
updating routing rules for the service mesh to indicate that
any first portions of traffic in the service mesh that are associated with the user account and that are directed to the current version of the microservice are to be routed to the updated microservice, and
any second portions of traffic in the service mesh that are directed from the updated microservice to the first instance of the dependent microservice are to be routed to the second instance of the dependent microservice; and
in response to receiving first traffic of the traffic, wherein the first traffic is determined to be associated with the user account and determined to be directed to the current version of the microservice, routing the first traffic to the updated microservice instead of routing the first traffic to the current version of the microservice.

16. The non-transitory computer-readable medium of claim 15, wherein updating the routing rules transforms first routing rules to second routing rules, and further comprising:
after routing the first traffic, and in response to determining to end deploying the updated microservice,
terminating execution of the updated microservice,
terminating the second instance of the dependent microservice, and
reverting the second routing rules to the first routing rules.

17. The non-transitory computer-readable medium of claim 15, wherein the operations further comprise:
in response to receiving second traffic of the traffic, wherein the second traffic is determined not to be associated with the user account and is determined to be directed to the current version of the microservice, routing the second traffic to the current version of the microservice instead of routing the second traffic to the updated microservice.

18. The non-transitory computer-readable medium of claim 15, wherein the service mesh comprises an infrastructure layer for a group of microservices that comprises the updated microservice and the current version of the microservice.

19. The non-transitory computer-readable medium of claim 15, wherein the updated microservice is part of a first isolated environment of the service mesh, wherein the current version of the microservice is part of a second isolated environment of the service mesh, wherein the first isolated environment is configured to receive the first traffic and is configured to exclude second traffic of the traffic, and wherein the second isolated environment is configured to receive the second traffic and is configured to exclude the first traffic.

20. The non-transitory computer-readable medium of claim 15, wherein the operations further comprise:
   in response to receiving second traffic originated by the updated microservice and directed to the first instance of the dependent microservice, routing the second traffic to the second instance of the dependent microservice.

\* \* \* \* \*